United States Patent
Chen et al.

(10) Patent No.: US 8,315,435 B2
(45) Date of Patent: Nov. 20, 2012

(54) IMAGE PROCESSING APPARATUS AND METHOD

(75) Inventors: Chien-Chen Chen, Taipei (TW); Chun-Hsing Hsieh, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 612 days.

(21) Appl. No.: 12/578,914

(22) Filed: Oct. 14, 2009

(65) Prior Publication Data

US 2010/0092044 A1    Apr. 15, 2010

(30) Foreign Application Priority Data

Oct. 15, 2008   (TW) ............................... 97139515 A

(51) Int. Cl.
*G06K 9/00* (2006.01)
(52) U.S. Cl. ..................................... 382/107
(58) Field of Classification Search .......... 382/103, 382/107, 236; 348/154, 155, 169; 396/153
See application file for complete search history.

(56) References Cited

U.S. PATENT DOCUMENTS

| | | | | |
|---|---|---|---|---|
| 4,661,846 A | * | 4/1987 | Kondo | 348/699 |
| 5,434,617 A | * | 7/1995 | Bianchi | 348/170 |
| 5,751,362 A | * | 5/1998 | Lee | 375/240.16 |
| 6,061,100 A | | 5/2000 | Ward et al. | |
| 6,243,419 B1 | * | 6/2001 | Satou et al. | 375/240.13 |
| 7,970,170 B2 | * | 6/2011 | Tener et al. | 382/103 |
| 8,063,993 B2 | * | 11/2011 | Peng | 348/607 |
| 2003/0227973 A1 | | 12/2003 | Nishibori et al. | |
| 2005/0220188 A1 | * | 10/2005 | Wang | 375/240.03 |

FOREIGN PATENT DOCUMENTS

TW    200822015 A    5/2008

* cited by examiner

*Primary Examiner* — Jason M Repko
*Assistant Examiner* — Shervin Nakhjavan
(74) *Attorney, Agent, or Firm* — The Webb Law Firm

(57) ABSTRACT

An image processing apparatus includes: a pixel difference calculator for calculating a difference value between each first pixel of a previous image and a second pixel of a present image and at a position corresponding to said each first pixel, and outputting a plurality of pixel differences; a counter counting a number of positive pixel differences and a number of negative pixel differences in the pixel differences of a sampling window; a motion level determining unit calculating a motion level of a pixel in the sampling window according to the numbers of the positive and negative pixel differences; a blending value determining unit determining a blending value according to the motion level; and an output unit adding together weights of the present and previous images according to the blending value to generate and output an output image. An image processing method is also disclosed.

20 Claims, 14 Drawing Sheets

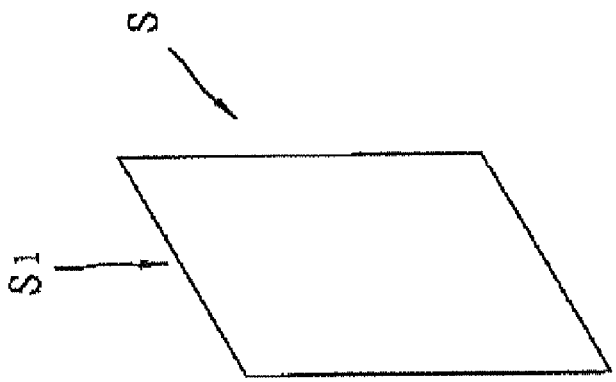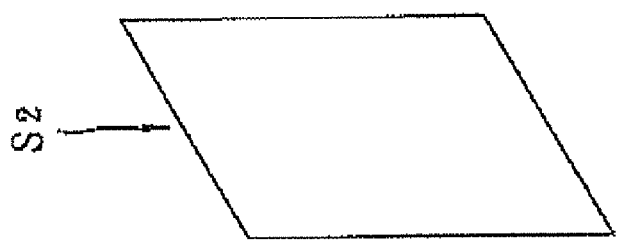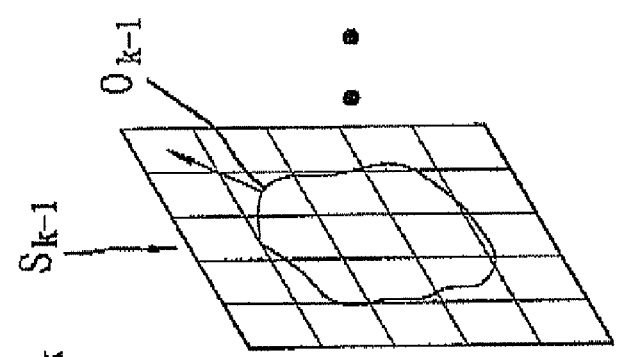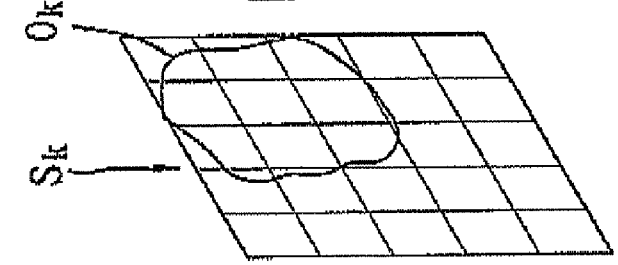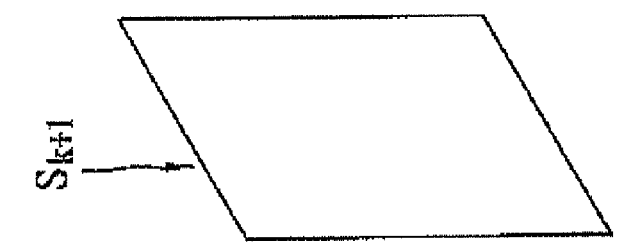
FIG. 1

IMAGE PROCESSING APPARATUS AND METHOD

CROSS-REFERENCE TO RELATED APPLICATION

This application claims priority of Taiwanese Application No. 097139515, filed on Oct. 15, 2008.

BACKGROUND OF THE INVENTION

1. Field of the Invention

The present invention relates to an image processing apparatus and method, more particularly to an image processing apparatus and method for determining a blending value by estimating a motion level of an image.

2. Description of the Related Art

Video content typically includes a plurality of frames or fields, and the frames for fields) are transmitted as a consecutive sequence. During transmission, if there is a moving object in the video content, pixel differences are present between current and previous frames, that is, differences between pixel values of pixels of the same location occur with respect to present and previous frames. This is because a pixel may be part of an object in the previous frame, and the same pixel may change to be part of the background in the present frame. Therefore, the error is the pixel difference between the object and the background.

Since dynamic images and static images are processed differently during image processing, in order to enhance image processing quality, it is must first be determined which of the pixels in an image are dynamic pixels and which are static pixels, such that subsequent processing may be performed depending on such a pixel classification.

At present, mean absolute difference (MAD) is the most widely used technique for determining whether video content exhibits moving object characteristics. This is accomplished by comparing a MAD value with a predetermined threshold value. The larger the MAD value, the greater the number of pixel differences caused by object movement, and the smaller the MAD value, the smaller the number of pixel differences caused by object movement. Therefore, conventional approaches use the size of the numerical value of MAD to determine whether there is object movement.

The formula for calculating MAD is shown in the following Formula (F1):

$$MAD(dx, dy) = \frac{1}{m \cdot n} \sum_{i=0}^{n} \sum_{j=0}^{m} |P_k(i, j) - P_{k-1}(i, j)| \quad (F.1)$$

where m and n are resolution dimensions of video content, $P_k(i,j)$ is a pixel value of a pixel at position (i,j) of a kth frame, and $P_{k-1}(i,j)$ is a pixel value of a pixel at position (i,j) of a (k−1)th frame. "Pixel value" refers to the luminance value (luma) or the chromatic value (chrome) of a pixel.

An example is provided with reference to FIG. 1 which shows a consecutive frame sequence (S) including frames $S_1$, $S_2 \ldots S_{k-1}, S_k, S_{k+1}$, etc. Referring additionally to FIG. 2, if it is assumed that an object $O_k$ in the frame $S_k$ is moved relative to an object $O_{k-1}$ in the frame $S_{k-1}$, then $MAD_{motion}$ is calculated as follows:

$$MAD_{noise} = \frac{1}{5 \cdot 5}[|45-40|+|35-35|+|32-32|+|41-41|+|40-40|+|47-20|+$$
$$|30-26|+|20-25|+|36-30|+|35-35|+|40-20|+$$
$$|20-20|+|18-20|+|24-24|+|11-27|+|20-20|+$$
$$|18-20|+|20-20|+|10-18|+|26-26|++|20-20|+$$
$$|29-20|+|20-20|+|10-20|+|36-25|] = 5$$

$MAD_{motion}$ is compared with a threshold value to determine if there is a moving object in the frame.

However, during processing or transmission of video signals, some of the frames or fields may be affected by noise to thereby undergo change (e.g., some of the pixel values change). For instance, referring to FIGS. 3 and 4, if it is assumed that there is noise in the frame $S_k$, this may cause at least one pixel value in the frame $S_k$ to change. If it is further assumed that there is no moving object and a pixel in the frame $S_k$ undergoes change due to noise, then $MAD_{noise}$ may be calculated as follows using Formula (F1):

$$MAD_{noise} = \frac{1}{5 \cdot 5}[|45-40|+|35-35|+|32-32|+|41-41|+|40-40|+|47-20|+$$
$$|30-26|+|20-25|+|36-30|+|35-35|+|40-20|+$$
$$|20-20|+|18-20|+|24-24|+|11-27|+|20-20|+$$
$$|18-20|+|20-20|+|10-18|+|26-26|++|20-20|+$$
$$|29-20|+|20-20|+|10-20|+|36-25|] = 5$$

From the foregoing, it is evident that with respect to the frame $S_k$, there is no difference between $MAD_{noise}$ occurring when there is noise and $MAD_{motion}$ occurring when there is object movement in a frame. Hence, using the conventional determination method, it is not possible to determine whether differences in pixel values between a present image and a previous image are due to noise interference or dynamic imaging.

When movement in an image is mistaken for noise interference, loss of image fidelity will occur. Since MAD is the result of object movement during dynamic imaging, each pixel value in the frame $S_k$ is not necessarily related to the previous frame $S_{k-1}$. For example, due to object movement, pixel (i,j) may be part of an object in the frame $S_{k-1}$, while the same pixel (i,j) may be part of the background in the frame $S_k$. If this is mistaken for noise interference, and mean processing is performed for the pixel values of the previous and subsequent images in order to cancel the noise, the end result may be image streaking. Such mistaking movement in an image for noise interference is highly possible using conventional approaches.

SUMMARY OF THE INVENTION

Therefore, the object of the present invention is to provide an image processing apparatus and method which are capable of differentiating between whether pixel differences are caused by noise interference or object motion, thereby ensuring high quality and efficiency of image processing.

According to one aspect, the image processing apparatus of this invention is used to process a previous image having a plurality of first pixels and a present image having a plurality of second pixels, and to output an output image. The image processing apparatus comprises: a pixel difference calculator for calculating a difference value between each first pixel and a second pixel at a position corresponding to said each first pixel, and outputting a plurality of pixel differences; a counter counting a number of positive pixel differences and a number of negative pixel differences in the pixel differences of a sampling window; a motion level determining unit calculating a motion level of a pixel in the sampling window according to the number of the positive pixel differences and the number of the negative pixel differences counted by the counter; a blending value determining unit coupled to the motion level determining unit, and for determining a blending value according to the motion level; and an output unit coupled to the blending value determining unit, and for adding together weights of the present image and the previous image according to the blending value to generate and output an output image.

According to another aspect, the image processing method of this invention processes a previous image having a plurality of first pixels and a present image having a plurality of second pixels, and outputs an output image. The image processing method comprises: calculating a difference value between each first pixel and a second pixel at a position corresponding to said each first pixel, and outputting a plurality of pixel differences; counting a number of positive pixel differences and a number of negative pixel differences in the pixel differences of a sampling window; calculating a motion level of a pixel in the sampling window according to the number of the positive pixel differences and the number of the negative pixel differences; determining a blending value according to the motion level; and adding together weights of the present image and the previous image according to the blending value to generate and output an output image.

BRIEF DESCRIPTION OF THE DRAWINGS

Other features and advantages of the present invention will become apparent in the following detailed description of the preferred embodiments with reference to the accompanying drawings, of which:

FIG. 1 is a schematic diagram of an image sequence including a moving object;

DETAILED DESCRIPTION OF THE PREFERRED EMBODIMENTS

Figure 2:
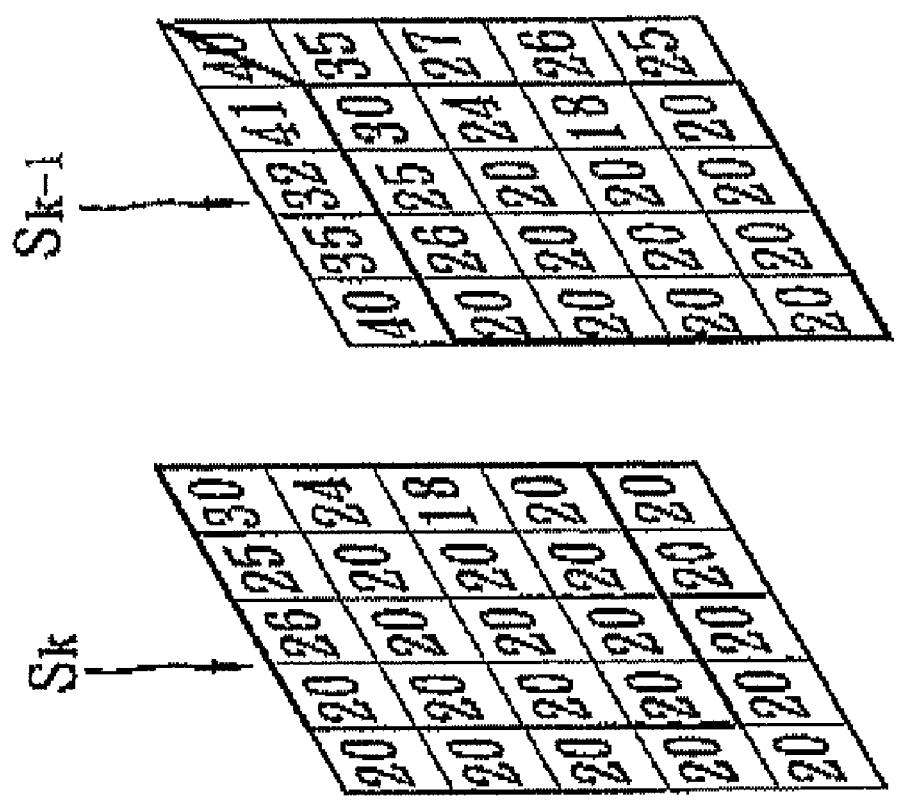
FIG. 2 is a schematic diagram illustrating pixel values of an image that includes a moving object.
Figure 3:
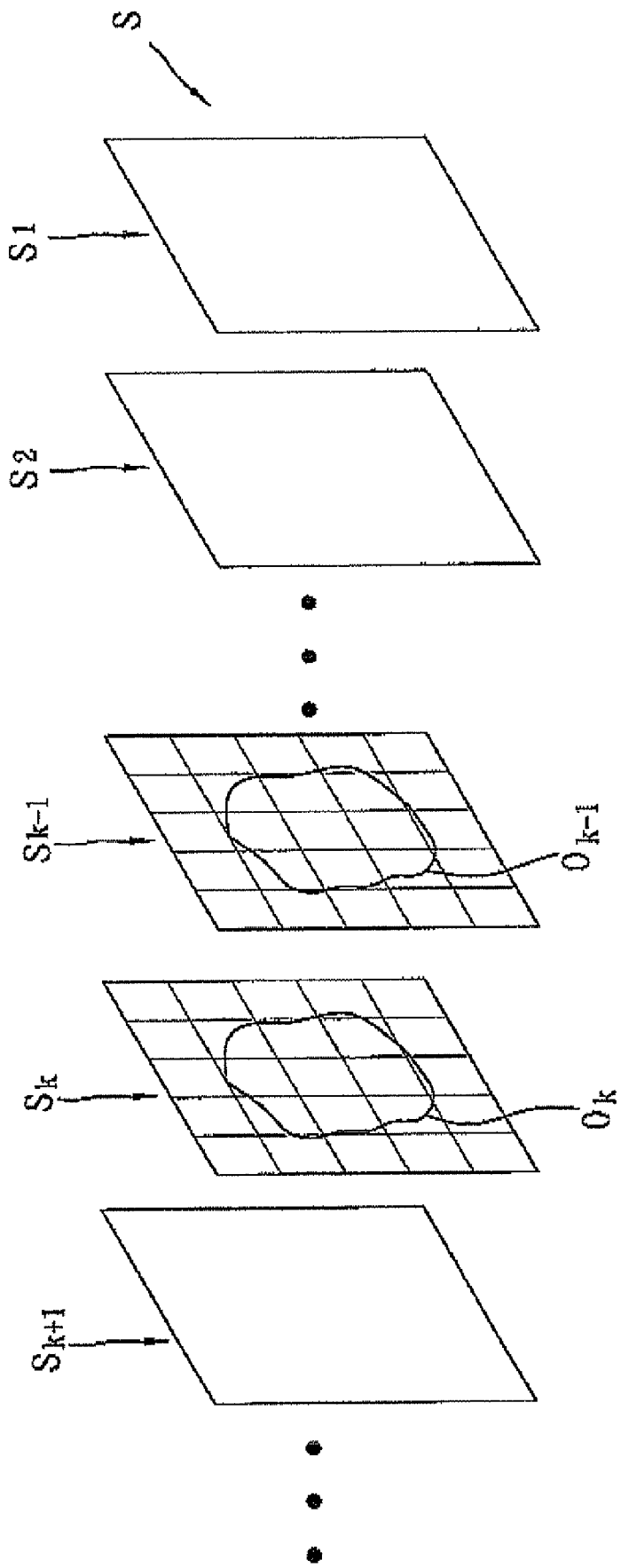
FIG. 3 is a schematic diagram of a frame sequence.
Figure 4:
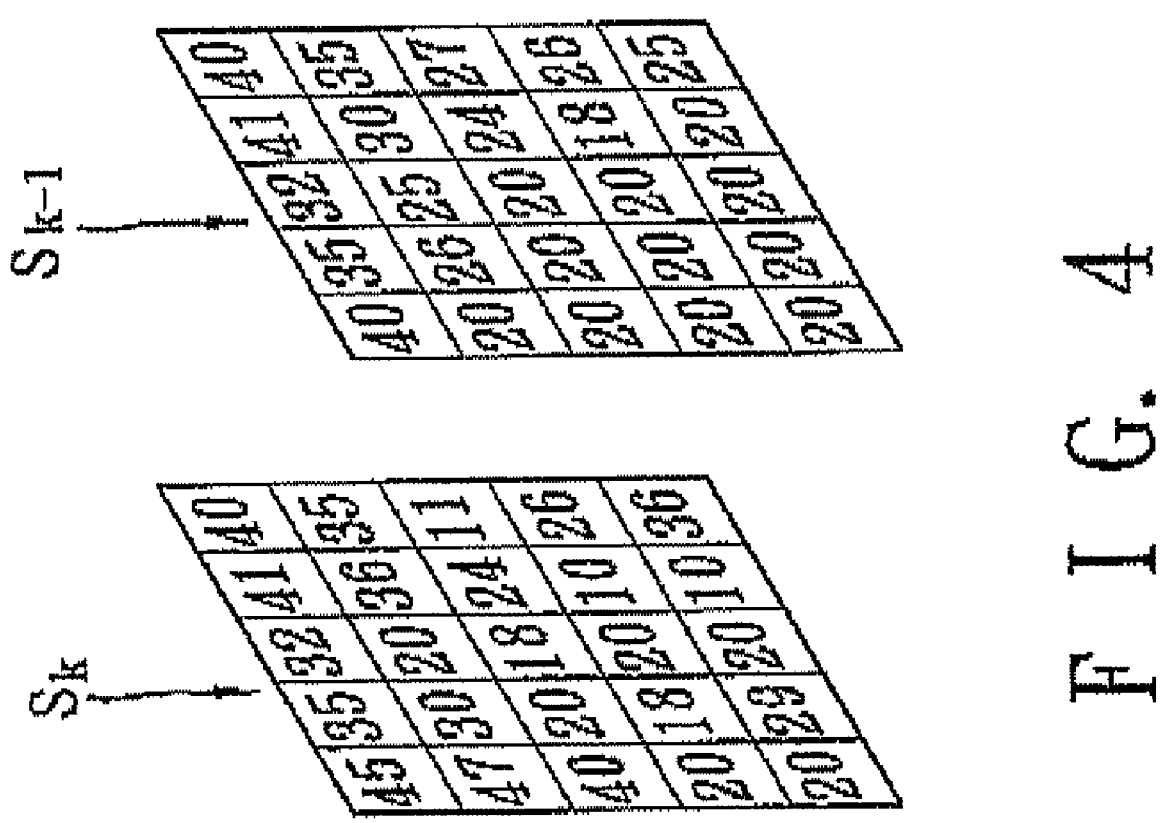
FIG. 4 is a schematic diagram illustrating how pixel values of an image are affected by noise interference.

Before the present invention is described in greater detail with reference to the accompanying preferred embodiments, it should be noted herein that like elements are denoted by the same reference numerals throughout the disclosure.

First Preferred Embodiment

Figure 5:
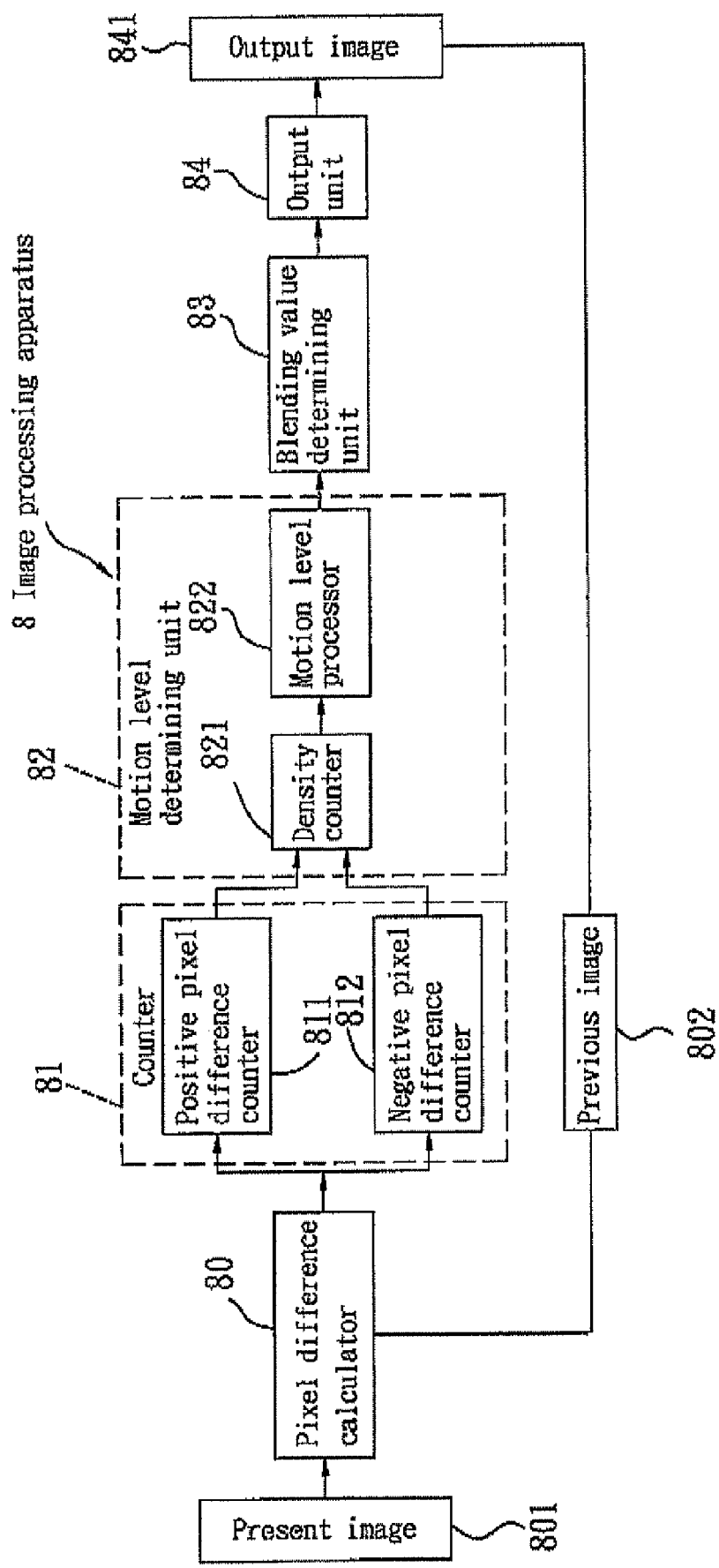
FIG. 5 is a schematic circuit block diagram of an image processing apparatus according to a first preferred embodiment of the present invention.

Referring to FIG. 5, the first preferred embodiment of an image processing apparatus 8 according to the present invention comprises a pixel difference calculator 80, a counter 81, emotion level determining unit 82, a blending value determining unit 83, and an output unit 84.

The pixel difference calculator 80 receives a present image 801 and a previous image 802. Each of the present image 801 and the previous image 802 has a plurality of pixels, and each pixel has a pixel value which includes a luma and a chrome.

The pixel difference calculator 80 uses each pixel of the present image 801 as a center point to establish a corresponding present sampling window. The present sampling window may be a predetermined size of m×n, or may be a size that is defined by the user. At the same time, the pixel difference calculator 80 uses each pixel of the previous image 802 as a center point to establish a corresponding previous sampling window. Next, the pixel difference calculator 80 performs a pixel value difference calculation with respect to the present sampling window of each pixel and the previous sampling window of a pixel of a corresponding location to thereby calculate corresponding pixel differences, then collects all the pixel differences to form a pixel difference matrix 803.

Figure 6:
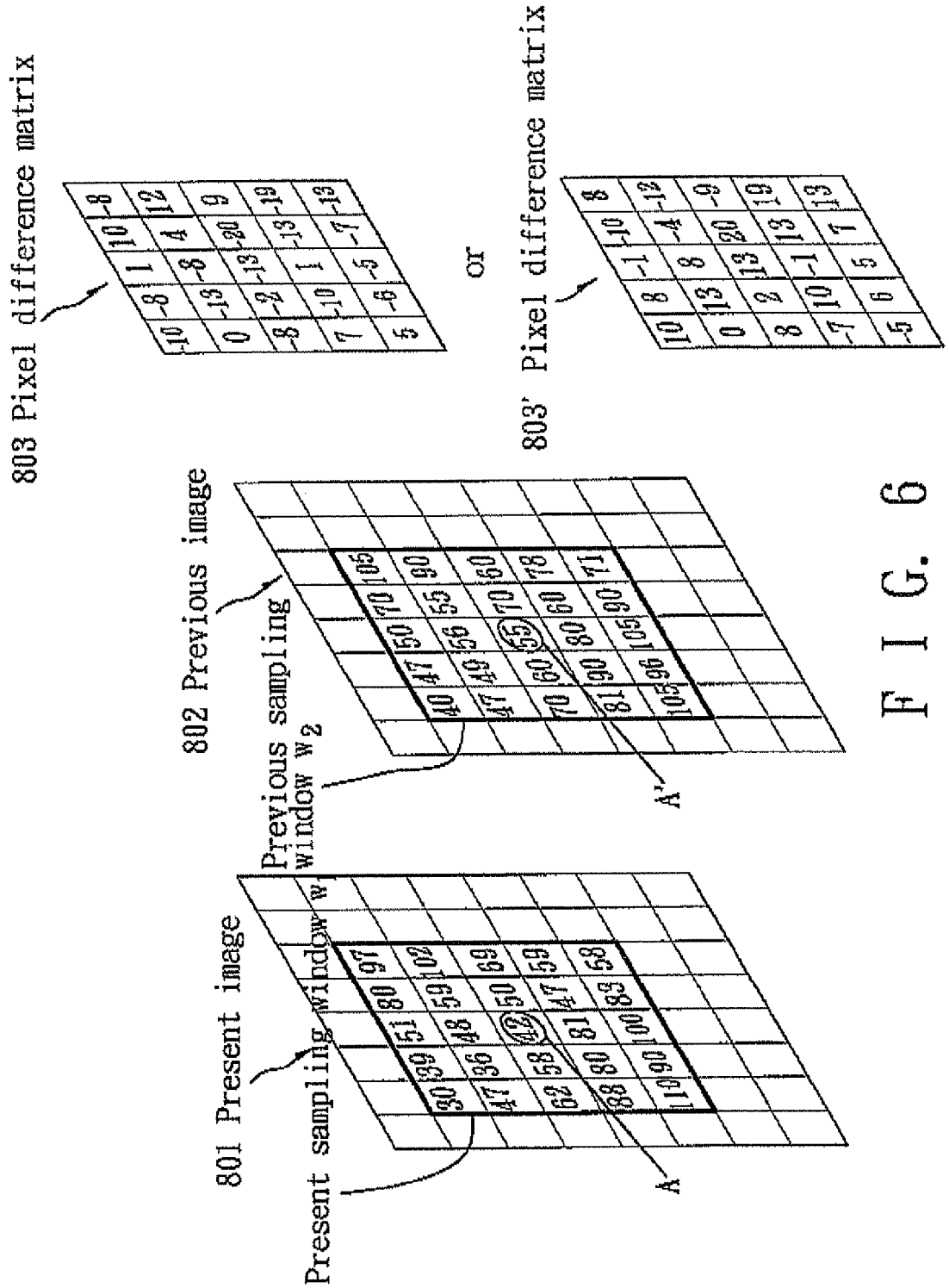
FIG. 6 is a schematic diagram of a present sampling window, a previous sampling window, and pixel difference matrices.

To provide an example, with reference to FIG. 6, assuming a sampling window size of 5×5, for a pair of pixels A and A' disposed at the same position of the present image 801 and the previous image 802, the corresponding present and previous sampling windows are $W_1$ and $W_2$, respectively. When the pixel difference calculator 80 is configured to subtract pixel values of a previous sampling window from corresponding pixel values of a present sampling window, then the pixel difference matrix 803 is the result. Alternatively, when the pixel difference calculator 80 is configured to subtract pixels values of a present sampling window from corresponding pixel values of a previous sampling window, then the pixel difference matrix 803' is the result.

Figure 7:
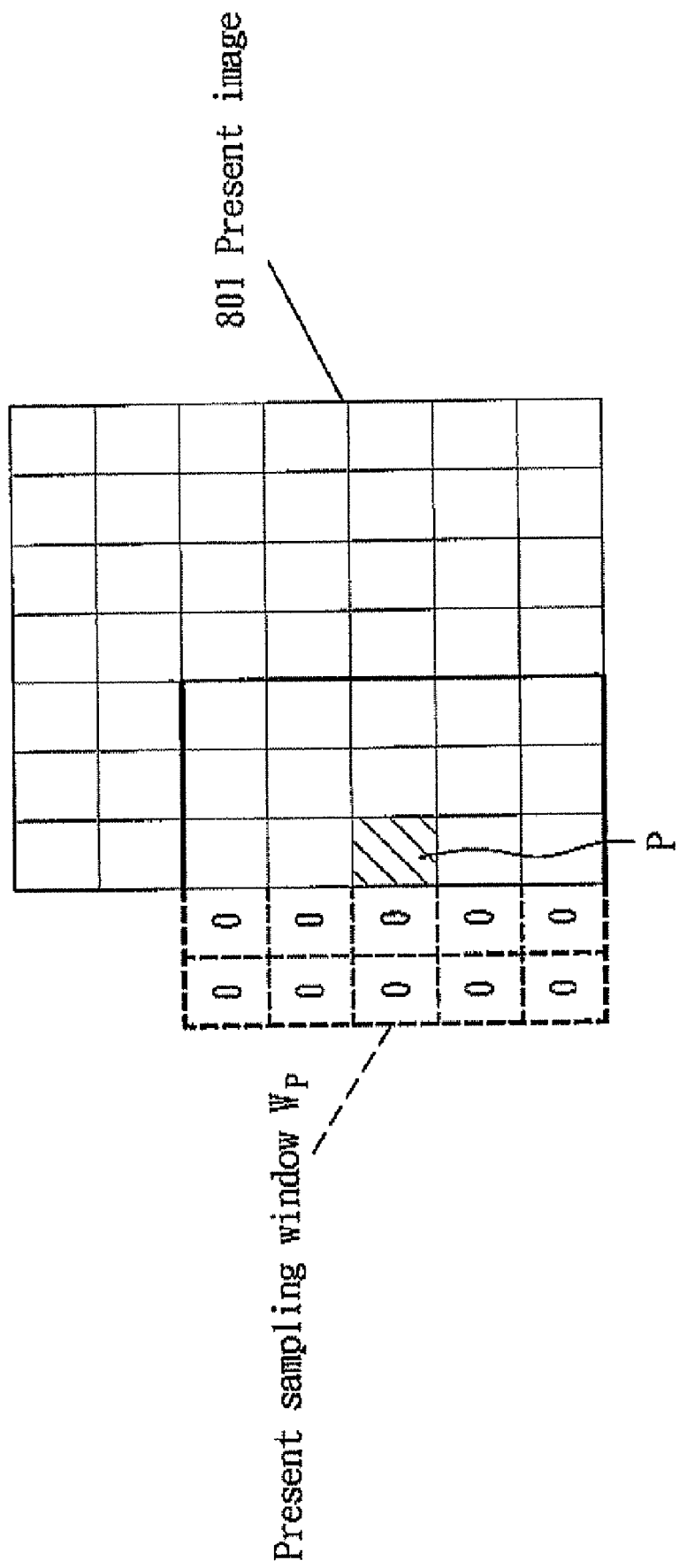
FIG. 7 is a schematic diagram of a sampling window for a pixel at a boundary of an image.

Referring to FIG. 7, it is to be noted that for a pixel difference at a boundary of an image (e.g., pixel difference P at a boundary of the present image 801), a value of "0" for portions that lie outside the image may be used, such that a sampling window (e.g., present sampling window $W_F$) may still be established. In this example, since the previous image 802 has the same portion that lies outside the boundary thereof, the processing result remains unaffected.

Referring back to FIG. 5, the counter 81 includes a positive pixel difference counter 811 and a negative pixel difference counter 812.

The positive pixel difference counter 811 is used to count the number of pixel differences with a positive sign in each pixel difference matrix 803, and the negative pixel difference counter 812 is used to count the number of pixel differences with a negative sign in each pixel difference matrix 803.

The motion level determining unit 82 includes a density counter 821 and a motion level processor 822.

The density counter 821 receives the number of positive pixel differences and the number of negative pixel differences in each pixel difference matrix 803, and calculates a positive pixel difference density and a negative pixel difference density using the following equations:

positive pixel difference density=number of positive pixel differences/sampling window size ($m \times n$)

negative pixel difference density=number of negative pixel differences/sampling window size ($m \times n$)

The motion level processor 822 selects an appropriate motion level (ML) according to the positive pixel difference density and the negative pixel difference density in each pixel difference matrix 803, and three predetermined threshold values (i.e., a first threshold value, a second threshold value, and a third threshold value, in which the first threshold value is larger than the second threshold value and the second threshold value is larger than the third threshold value). When the positive pixel difference density or the negative pixel difference density is larger than the first threshold value, this indicates that there is a relatively large number of pixel differences in the pixel difference matrix 803. That is, the motion level (ML) between the present sampling window and the previous sampling window is somewhat large, and so the motion level (ML) can be set to a predetermined motion level value ($ML_1$). In a similar manner, when both the positive pixel difference density and the negative pixel difference density are smaller than the first threshold value, and one of the positive pixel difference density and the negative pixel difference density is larger than the second threshold value, the motion level (ML) can be set to a predetermined motion level value ($ML_2$), which is smaller than the motion level value ($ML_1$). If the situation does not fall into either one of the above two categories, this indicates that the pixel variations in the pixel difference matrix 803 are not obvious. In this case, the motion level processor 822 uses a more precise sub-sampling window determination process, as outlined below.

Figure 8:
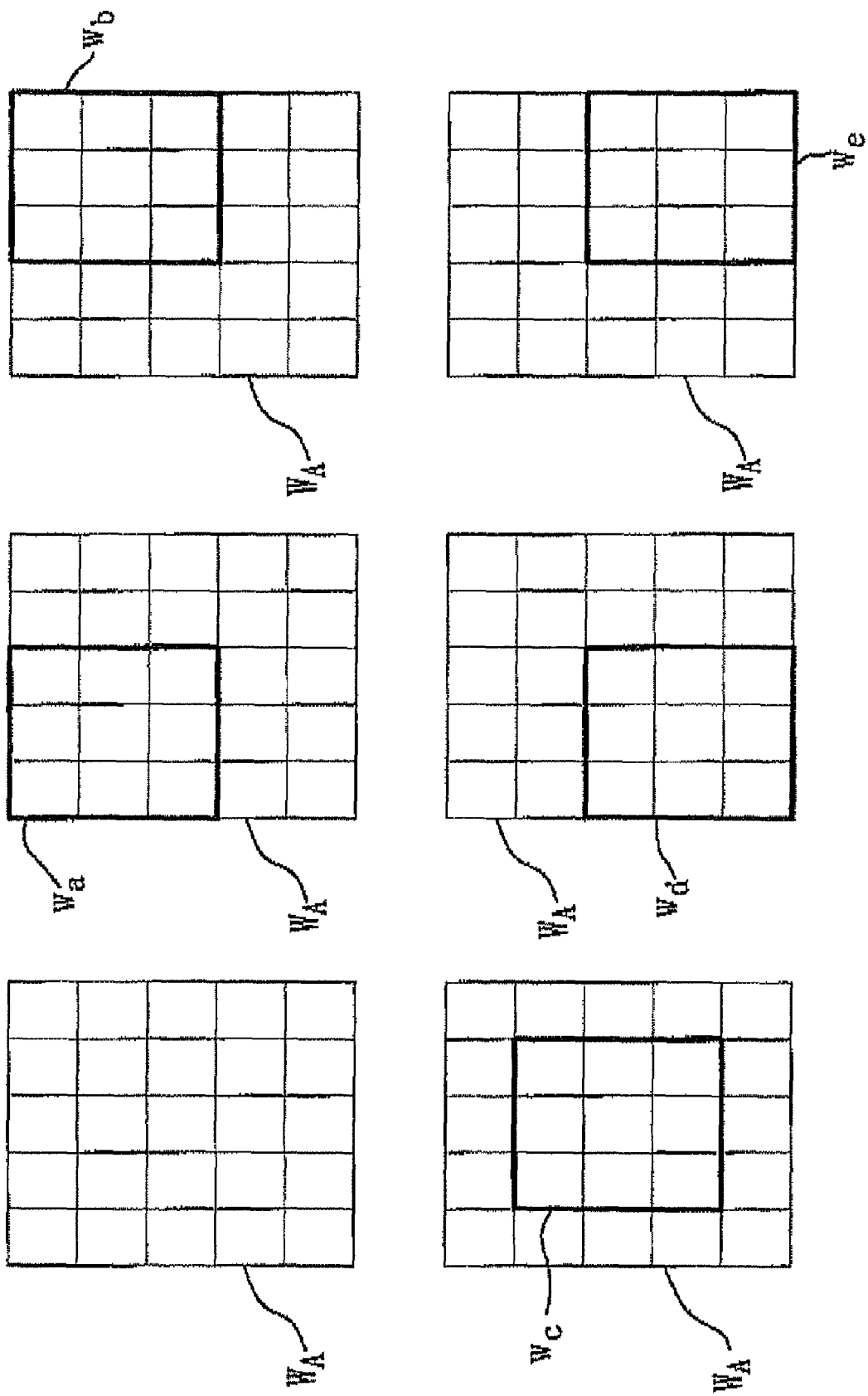
FIG. 8 is a schematic diagram illustrating how sub-sampling windows may be established.

To provide an example, with reference to FIG. 8, with respect to a 5×5 pixel difference matrix ($W_A$), when the positive pixel difference density or the negative pixel difference density thereof is not larger than the second threshold value, the motion level processor 822 establishes five sub-sampling windows which are smaller than the pixel difference matrix ($W_A$) (for instance, each having a size of 3×3), as shown by $w_a \sim w_e$ in FIG. 8. Subsequently, the positive pixel difference density and the negative pixel difference density of each sub-sampling window are calculated. When the positive pixel difference density or the negative pixel difference density of one of the sub-sampling windows is larger than the third threshold value, this indicates that there is slight motion in the pixel difference matrix, and therefore, the motion level (ML) can be set to a predetermined motion level value ($ML_3$), which is smaller than both the motion level values ($ML_1$) and ($ML_2$). If the positive pixel densities and the negative pixel densities of all the sub-sampling windows are smaller than the third threshold value, this indicates that the pixel is a static pixel, and the motion level (ML) can be set to a predetermined motion level value ($ML_0$), which can have a value of "0" or close to "0."

It is to be noted that the presetting of the threshold values and motion levels are not limited to what is disclosed herein. Different values and different numbers of the threshold values and motion levels may be established as needed, or the threshold values and motion levels may be established by using a continuous function or a discrete function in which the positive pixel densities and negative pixel densities are used as variables and a motion level is obtained as an output.

Referring back to FIG. 5, the blending value determining unit 83 determines a blending value (K) of each pixel with reference to a table using the motion level (ML) of said each pixel selected by the motion level processor 822. In this embodiment, the blending value (K) is inversely related to the motion level (ML). That is, the larger the motion level (ML) of a pixel, the greater the dynamic component in the pixel, and therefore, the ratio of the present image 801 must be increased. As a result, the blending value (K) is smaller accordingly. In practice, the relation between the blending value (K) and the motion level (ML) of a pixel is not necessary obtained by referencing a table, and the relation between the motion level (ML) of a pixel and the blending value (K) may be set using a continuous function or a discrete function. Moreover, the relation between the motion level (ML) of a pixel and the blending value (K) may be determined in different ways and may be inverse or direct in nature, and is not limited to what is disclosed herein.

The output unit 84 calculates an output pixel according to the blending value (K) of each pixel. After the output pixels of all the pixels are calculated, the output pixels are collected to form an output image 841, which is fed back to the pixel difference calculator 80 for use as a previous image 802 in the next calculation. The formula for computing the output image 841 is as follows:

output pixel=corresponding pixel value of present image $801 \times (1-K)$+corresponding pixel value of previous image $802 \times K$.

Second Preferred Embodiment

The second preferred embodiment according to this invention differs from the first preferred embodiment in that the second preferred embodiment performs processing with respect to fields.

Figure 9:
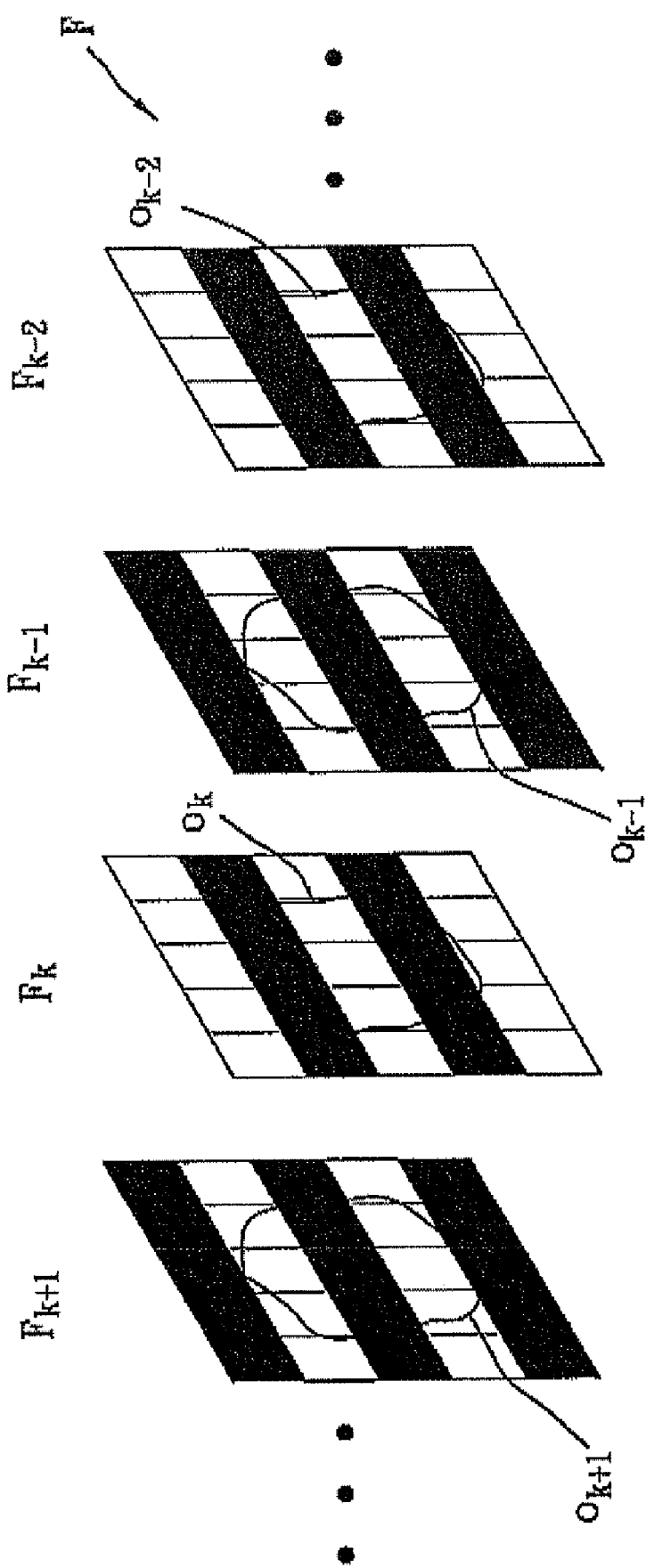
FIG. 9 is a schematic diagram of a field sequence.

Referring to FIG. 9, a consecutive field sequence (F) is formed by interposing a top field, such as field ($F_{k-2}$) or field ($F_k$), between a pair of bottom fields, such as fields ($F_{k-1}$) and ($F_{k+1}$).

Figure 10:
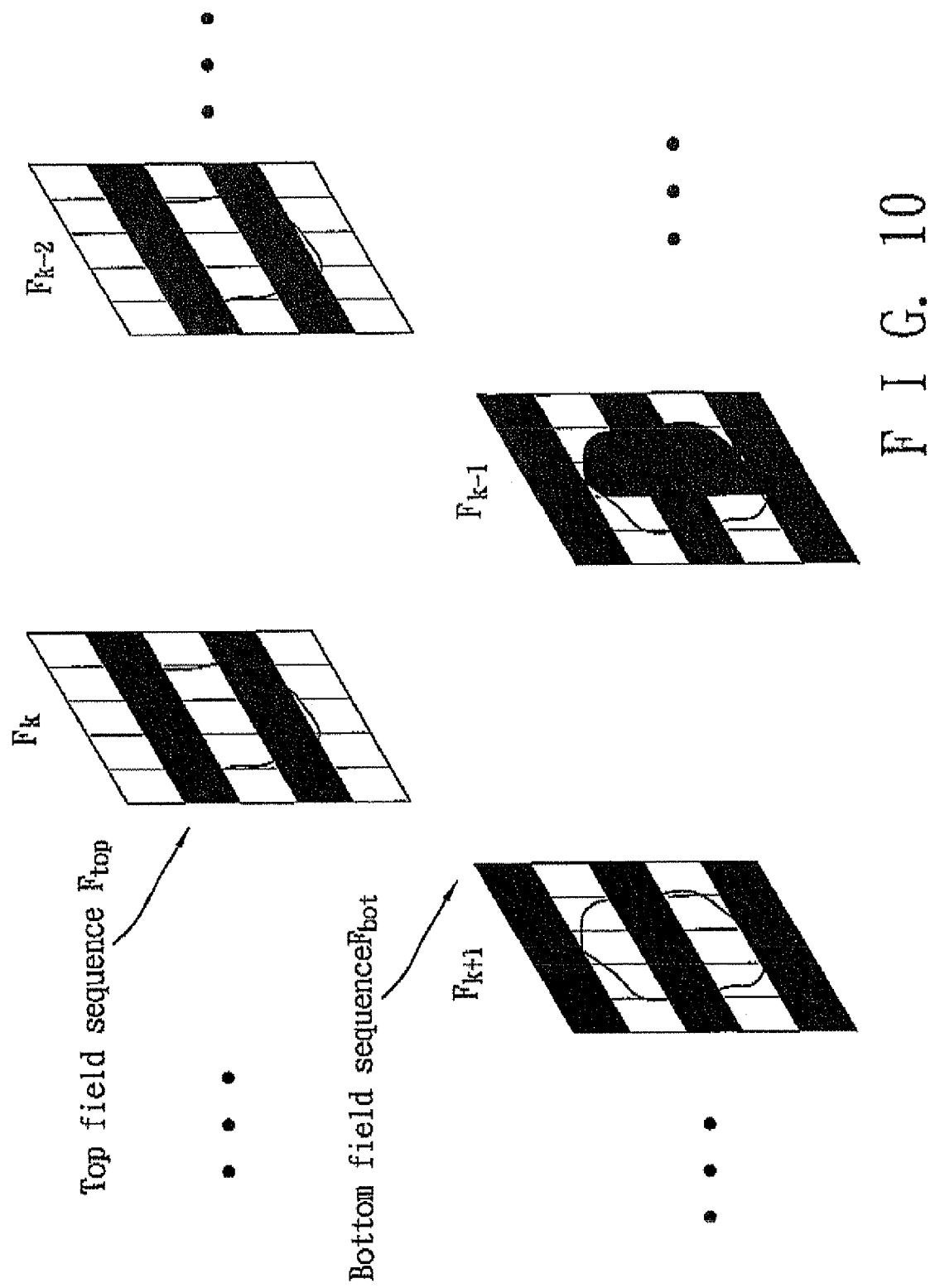
FIG. 10 is a schematic diagram of a top field sequence and a bottom field sequence.

Similar to the first preferred embodiment, the present image is a kth field (or a (k+1)th field), and the previous image is a (k−2)th field (or a (k−1)th field). Therefore, referring to FIG. 10, after the top field sequence ($F_{top}$) and the bottom field sequence ($F_{bot}$) are split into two independent field sequences, the image processing apparatus 8 of this invention can be used to perform movement level determination. For example, the field ($F_k$) of the top field sequence ($F_{top}$) is the present image and the field ($F_{k-2}$) thereof is the previous image. Similarly, the field ($F_{k+1}$) of the bottom field sequence ($F_{bot}$) is the present image and the field ($F_{k-1}$) thereof is the previous image. Subsequently, the top field sequence ($F_{top}$) and the bottom field sequence ($F_{bot}$) can be processed simultaneously by the image processing apparatus 8 in a parallel manner, or the image processing apparatus 8 may be used to perform processing of the top field sequence ($F_{top}$) and the bottom field sequence ($F_{bot}$) in a continuous manner utilizing a time-sharing scheme.

Third Preferred Embodiment

Figure 11:
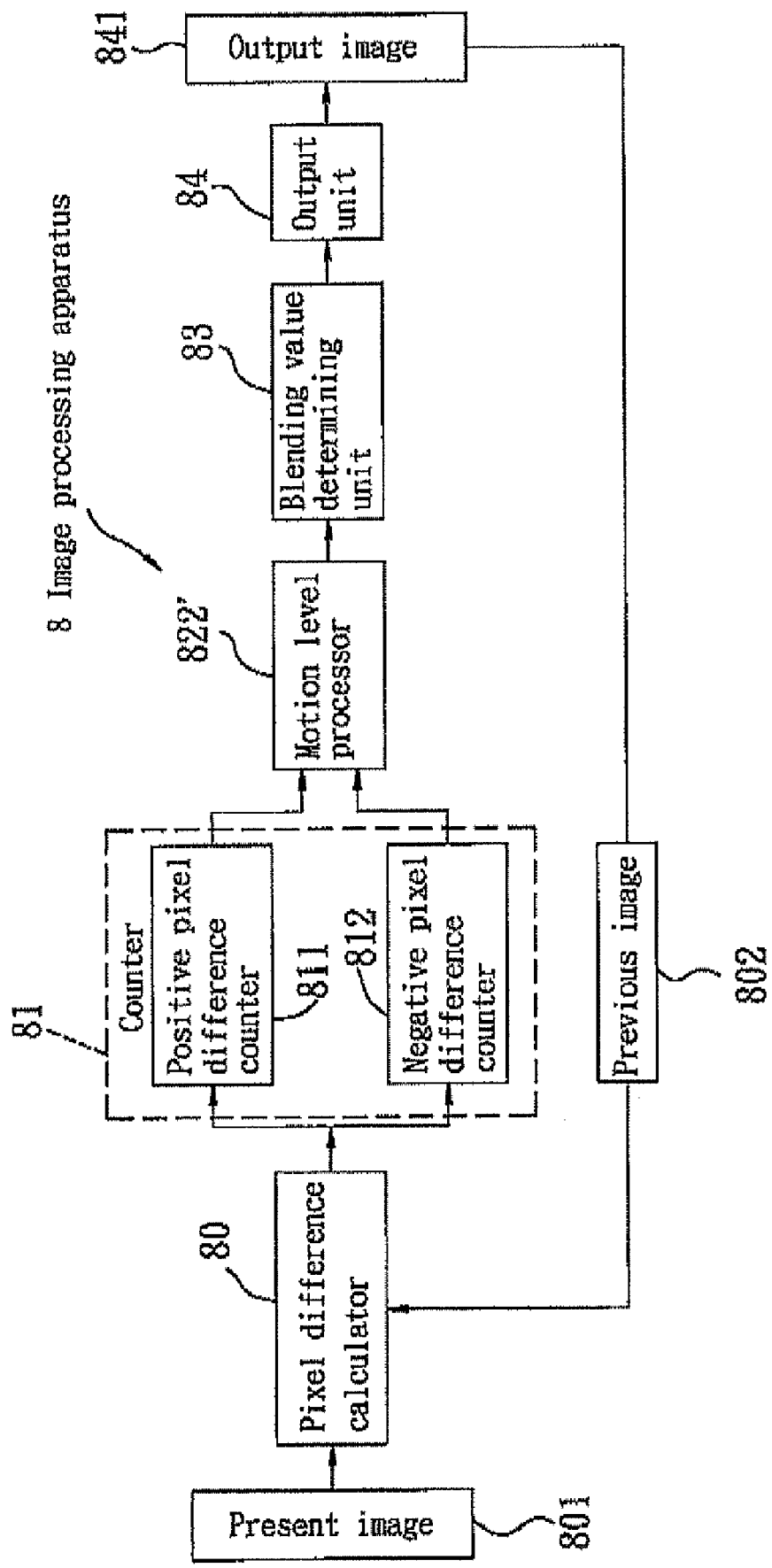
FIG. 11 is a schematic circuit block diagram of a third preferred embodiment of an image processing apparatus according to the present invention.

Referring to FIG. 11, the third preferred embodiment according to this invention differs from the first preferred embodiment in that the motion level processor 822' directly receives the number of positive pixel differences and the number of negative pixel differences output from the counter 81, and selects an appropriate motion level (ML) according to the number of positive pixel differences and the number of negative pixel differences in each pixel difference matrix, and three predetermined threshold values (a first threshold value, a second threshold value, and a third threshold value, in which the first threshold value is larger than the second threshold value and the second threshold value is larger than the third threshold value). When the number of positive pixel differences or the number of negative pixel differences is larger than the first threshold value, this indicates that there is a relatively large number of pixel differences in the pixel difference matrix 803. That is, the motion level (ML) between the previous sampling window and the present sampling window is somewhat large, and so the motion level (ML) can be set to a predetermined motion level value ($ML_4$). In a similar manner, when both the number of positive pixel differences and the number of negative pixel differences are smaller than the first threshold value, and one of the number of positive pixel differences and the number of negative pixel differences is larger than the second threshold value, the motion level (ML) can be set to a predetermined motion level value ($ML_5$), which is smaller than the motion level value ($ML_4$). If the situation does not fall into either one of the above two categories, this indicates that the pixel variations in the pixel difference matrix 803 are not obvious. In this case, the motion level processor 822' uses a more precise sub-sampling window determination process so as to accurately determine the motion level (ML) of a pixel.

For a pixel difference matrix 803, when both the number of positive pixel differences and the number of negative pixel differences thereof are not larger than the second threshold value, the motion level processor 822' establishes five sub-sampling windows which are smaller than the pixel difference matrix 803. Subsequently, the number of positive pixel differences and the number of negative pixel differences of each sub-sampling window are computed. When the number of positive pixel differences or the number of negative pixel differences of one of the sub-sampling windows is larger than the third threshold value, this indicates that there is a slight motion in the pixel difference matrix 803, and therefore, the motion level (ML) can be set to a predetermined motion level value ($ML_6$), which is smaller than both the motion level values ($ML_4$) and ($ML_5$). If the number of positive pixel differences and the number of negative pixel differences of all the sub-sampling windows are smaller than the third threshold value, this indicates that the pixel is a static pixel, and the motion level (ML) can be set to a predetermined motion level value ($ML_0$), which can have a value "0" or close to "0."

It is to be noted that the presetting of the threshold values and motion levels are not limited to what is disclosed herein. Different values and different numbers of the threshold values and motion levels may be established as needed, or the threshold values and motion levels may be established by using a continuous function or a discrete function in which the number of the positive pixel differences and the number of the negative pixel differences are used as variables and a motion level is obtained as an output.

Fourth Preferred Embodiment

The fourth preferred embodiment according to this invention differs from the first preferred embodiment in that, in the first preferred embodiment, the pixel difference calculator 80 establishes a present sampling window for the present image 801 and a previous sampling window for the previous image 802, and then calculates pixel differences between the pixels of the present and previous sampling windows. However, in this embodiment, the pixel difference calculator 80 first calculates a pixel difference matrix 803" of the entire image, and then establishes a sampling window for each pixel difference in the pixel difference matrix 803". A more detailed explanation is provided below.

Figure 12:
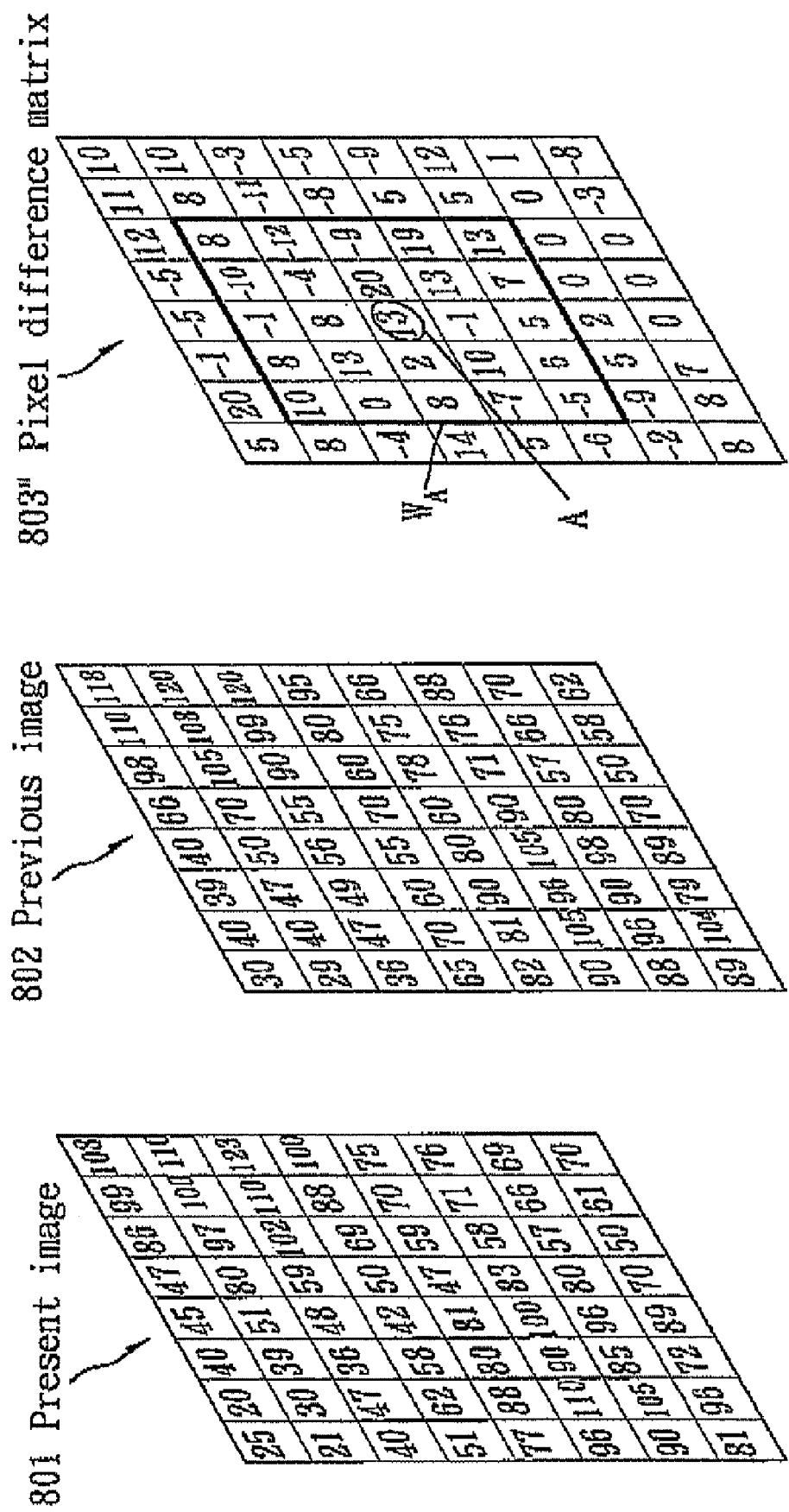
FIG. 12 is a schematic diagram of a pixel difference matrix according to a fourth preferred embodiment of the present invention.

The pixel difference calculator 80 calculates a pixel difference of each pixel according to pixel values of pixels at the same location in the present image 801 and the previous image 802, and collects all the pixel differences to form a pixel difference matrix 803". For instance, referring to FIG. 12, when the pixel difference calculator 80 is configured to subtract the pixel values of the present image 801 from the pixel values at corresponding locations of the previous image 802, the result is the pixel difference matrix 803", and the sampling window of the pixel difference (A) is as shown by ($W_A$).

The pixel difference calculator 80 then uses each pixel difference as a center point to set up a corresponding sampling window. Next, using the counter 81, the number of positive pixel differences and the number of negative pixel differences in the sampling window of each pixel are calculated.

First Preferred Embodiment of Image Processing Method

Figure 13:
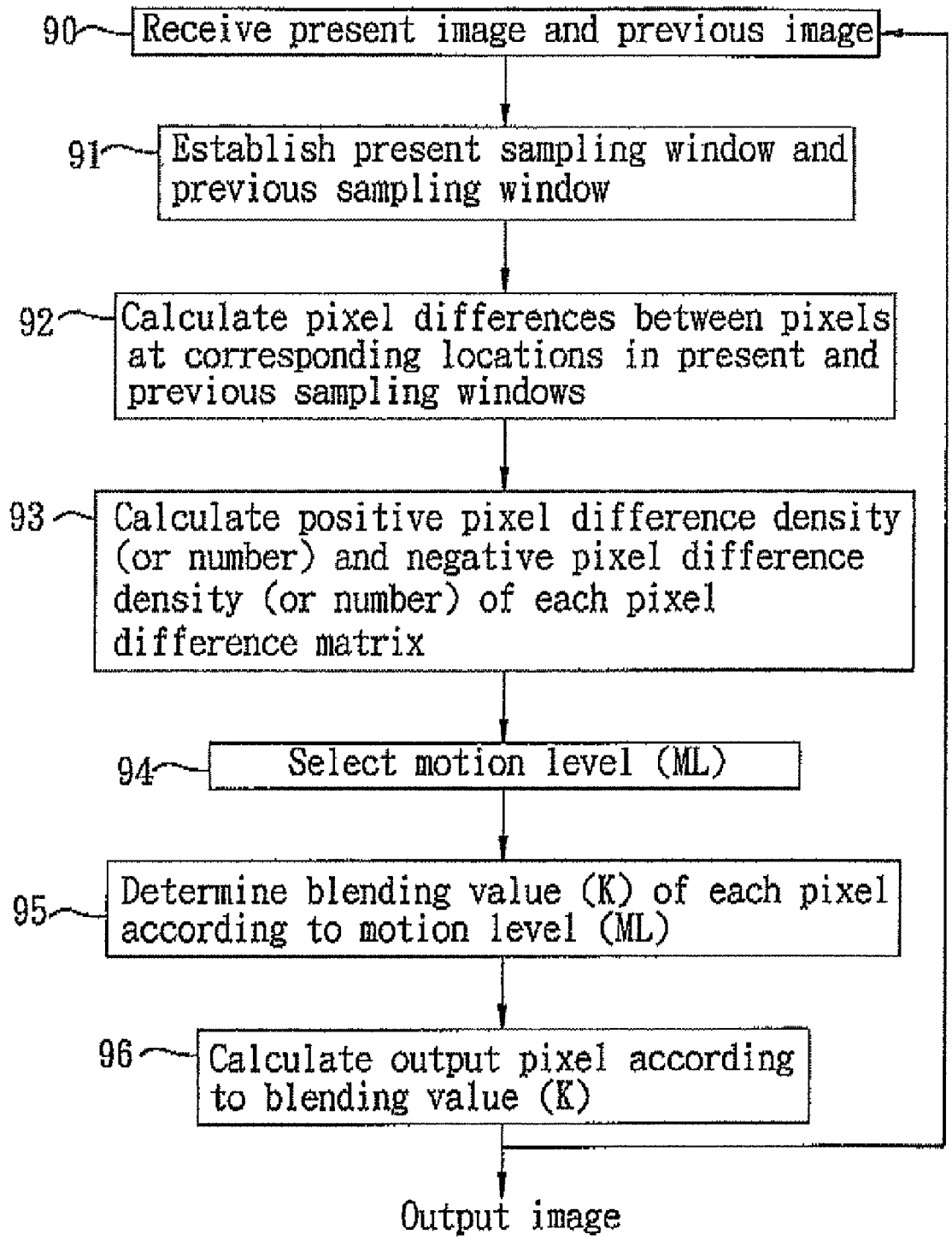
FIG. 13 is a flowchart of an image processing method according to a first preferred embodiment of the present invention.

Referring to FIG. 13, the first preferred embodiment of an image processing method according to this invention is used to determine a motion level in an image having a moving object. The image processing method includes the steps as outlined below.

In step 90, a present image 801 and a previous image 802 are received, in which the present image 801 is a kth frame (or kth field) and a previous image 802 is a (k−1)th frame (or (k−1)th field).

In step 91, a present sampling window and a previous sampling window, each with a size m×n, are established.

In step 92, pixel differences are calculated between pixels at corresponding locations in the present sampling window and the previous sampling window, and all the pixel differences are collected to form a pixel difference matrix 803.

In step 93, a positive pixel difference density (or number) and a negative pixel difference density (or number) of each pixel difference matrix is calculated.

In step 94, a motion level (ML) of a pixel is selected using any of the methods disclosed in the foregoing embodiments. The present invention is limited in this respect.

In step 95, using any of the methods disclosed in the foregoing embodiments, a blending value (K) of each pixel is determined according to the magnitude of the motion level (ML) of said each pixel.

In step 96, an output pixel is calculated according to the blending value (K) of each pixel, and after the output pixel corresponding to each pixel is calculated, the output pixels are collected to form an output image 841. The output image 841 is then fed back to the pixel difference calculator 80 for use as a previous image 802 in a subsequent calculation. The formula used to calculate the output pixel is as follows:

output pixel=pixel value corresponding to present image 801×(1−$K$)+pixel value corresponding to previous image 802×$K$

Second Preferred Embodiment of Image Processing Method

Figure 14:
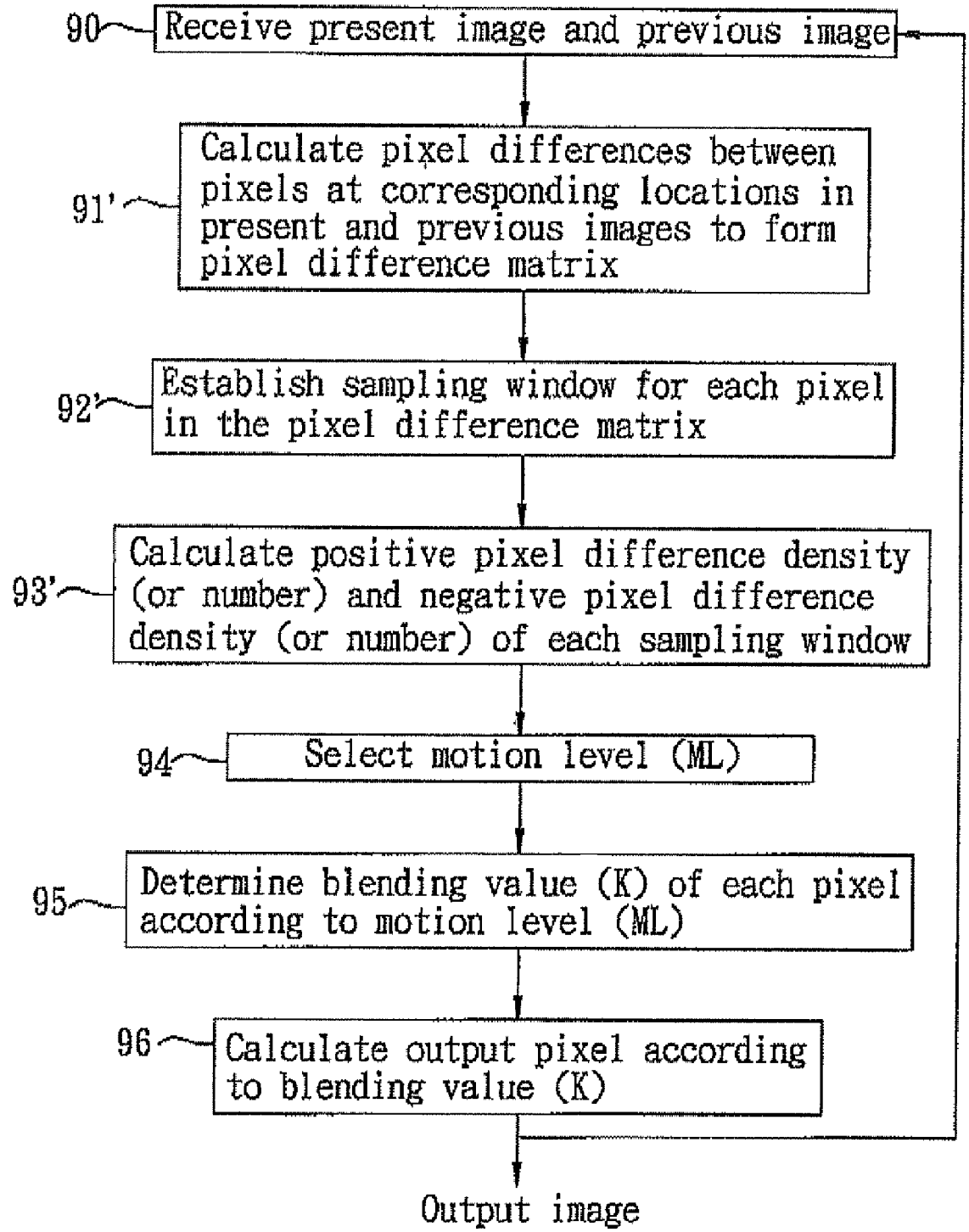
FIG. 14 is a flowchart of an image processing method according to a second preferred embodiment of the present invention.

Referring to FIG. 14, the second preferred embodiment of an image processing method according to this invention differs from the first preferred embodiment in that after the pixel difference matrix 803" of the entire image is calculated, a sampling window is established for each pixel difference in the pixel difference matrix 803".

The differences in the steps of this embodiment from those of the first preferred embodiment are as described in the following.

In step 91', pixel differences are calculated between pixels at corresponding locations in the present image 801 and the previous image 802, and all the pixel differences are collected to form a pixel difference matrix 803".

In step 92', a sampling window for each pixel in the pixel difference matrix 803" is established.

In step 93', a positive pixel difference density (or number) and a negative pixel difference density (or number) of each sampling window are calculated.

The other steps of the method are the same as those of the first preferred embodiment.

It is to be noted that, as described with reference to the third preferred embodiment, before step 94, the motion level (ML) of the pixel can be rapidly determined according to the number of the positive pixel differences and the number of the negative pixel differences.

In sum, in an image sequence, when there is a moving object in previous and subsequent images, the image processing apparatus and method of this invention are capable of accurately determining the motion level of the object. Furthermore, even slight motion of en object may be identified through use of the sub-sampling windows in the present invention, such that the image processing apparatus and method of this invention are capable of differentiating between whether pixel differences are caused by noise interference or slight object motion so as to more precisely determine the motion level of each pixel in an image. Hence, the quality and efficiency of image processing may be ensured.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An image processing apparatus for processing a previous image having a plurality of first pixels and a present image having a plurality of second pixels, and outputting an output image, said image processing apparatus comprising:
    a pixel difference calculator for calculating a difference value between each first pixel and one of the second pixels which position is corresponding to said first pixel so that output a plurality of pixel differences;
    a counter for counting a number of positive pixel differences and a number of negative pixel differences in the pixel differences of a sampling window;
    a motion level determining unit for calculating a motion level of a pixel in the sampling window according to the number of the positive pixel differences and the number of the negative pixel differences counted by said counter;
    a blending value determining unit coupled to said motion level determining unit, and for determining a blending value according to the motion level; and
    an output unit coupled to said blending value determining unit, and for adding together weights of the present image and the previous image according to the blending value to generate and output an output image.

2. The image processing apparatus of claim 1, wherein said output unit adds together a weight of a pixel of the present image with a weight of a pixel at a corresponding location of the previous image according to the blending value to thereby generate and output an output pixel of the output image.

3. The image processing apparatus of claim 1, wherein the blending value is directly proportional to the motion level.

4. The image processing apparatus of claim 1, wherein, when the number of the positive pixel differences or the number of the negative pixel differences is larger than a first threshold value, said pixel in the sampling window is determined to be a dynamic pixel.

5. The image processing apparatus of claim 1, wherein, when each of the number of the positive pixel differences and the number of the negative pixel differences is smaller than a second threshold value, at least one sub-sampling window is established in the sampling window, and a number of the positive pixel differences and a number of the negative pixel differences in the sub-sampling window are counted to determine whether said pixel in the sampling window is a dynamic pixel or a static pixel.

6. The image processing apparatus of claim 1, wherein said pixel in the sampling window is the center pixel of the sampling window.

7. The image processing apparatus of claim 1, wherein said counter comprises:
    a positive pixel difference counter for counting the number of the positive pixel differences; and
    a negative pixel difference counter for counting the number of the negative pixel differences.

8. The image processing apparatus of claim 1, wherein said motion level determining unit comprises:
    a density counter for calculating a positive pixel difference density and a negative pixel difference density from the number of the positive pixel differences and the number of the negative pixel differences in the sampling window; and
    a motion level processor coupled to said density counter for calculating the motion level of said pixel in the sampling window according to the positive pixel difference density and the negative pixel difference density.

9. The image processing apparatus of claim 8, wherein the positive pixel difference density is obtained by dividing the number of the positive pixel differences by the number of the pixels in the sampling window.

10. The image processing apparatus of claim 8, wherein the negative pixel difference density is obtained by dividing the number of the negative pixel differences by the number of the pixels in the sampling window.

11. An image processing method for processing a previous image having a plurality of first pixels and a present image having a plurality of second pixels, and outputting an output image, said image processing method comprising:
    calculating a difference value between each first pixel and one of second pixels which position is corresponding to said first pixel so that output a plurality of pixel differences;
    counting a number of positive pixel differences and a number of negative pixel differences in the pixel differences of a sampling window;
    calculating a motion level of a pixel in the sampling window according to the number of the positive pixel differences and the number of the negative pixel differences;
    determining a blending value according to the motion level; and adding together weights of the present image and the previous image according to the blending value to generate and output an output image.

12. The image processing method of claim 11, wherein in the adding together weights of the present image and the previous image according to the blending value to generate and output the output image, a weight of a pixel of the present image is added together with a weight of a pixel at a corresponding location of the previous image according to the blending value to thereby generate and output an output pixel of the output image.

13. The image processing method of claim 11, wherein the blending value is directly proportional to the motion level.

14. The image processing method of claim 11, wherein, when the number of the positive pixel differences or the number of the negative pixel differences is larger than a first threshold value, said pixel in the sampling window is determined to be a dynamic pixel.

15. The image processing method of claim 11, wherein, when each of the number of the positive pixel differences and the number of the negative pixel differences is smaller than a second threshold value, at least one sub-sampling window is established in the sampling window, and a number of the positive pixel differences and a number of the negative pixel differences in the sub-sampling window are counted to determine whether said pixel in the sampling window is a dynamic pixel or a static pixel.

16. The image processing method of claim 11, wherein said pixel in the sampling window is the center pixel of the sampling window.

17. The image processing method of claim 11, wherein the number of positive pixel differences is counted by a positive pixel difference counter and the number of negative pixel differences is counted by a negative pixel difference counter.

18. The image processing method of claim 11, further comprising calculating a positive pixel difference density and a negative pixel difference density from the number of the positive pixel differences and the number of the negative pixel differences in the sampling window, and calculating the motion level of said pixel in the sampling window according to the positive pixel difference density and the negative pixel difference density.

19. The image processing method of claim 18, wherein the positive pixel difference density is obtained by dividing the number of the positive pixel differences by the number of the pixels in the sampling window.

20. The image processing method of claim 18, wherein the negative pixel difference density is obtained by dividing the number of the negative pixel differences by the number of the pixels in the sampling window.

\* \* \* \* \*